(12) United States Patent
Freeman et al.

(10) Patent No.: US 10,570,230 B2
(45) Date of Patent: Feb. 25, 2020

(54) HETEROGENEOUS, CO-CONTINUOUS COPOLYMERS OF VINYLIDENE FLUORIDE

(71) Applicant: Arkema Inc., King of Prussia, PA (US)

(72) Inventors: Adam W. Freeman, Chalfont, PA (US); James J. Henry, Downingtown, PA (US); David A. Seiler, Garnet Valley, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 15/549,746

(22) PCT Filed: Feb. 5, 2016

(86) PCT No.: PCT/US2016/016710
§ 371 (c)(1),
(2) Date: Aug. 9, 2017

(87) PCT Pub. No.: WO2016/130413
PCT Pub. Date: Aug. 18, 2016

(65) Prior Publication Data
US 2018/0044456 A1 Feb. 15, 2018

Related U.S. Application Data

(60) Provisional application No. 62/113,690, filed on Feb. 9, 2015.

(51) Int. Cl.
*C08F 214/22* (2006.01)
*C08F 2/01* (2006.01)
(Continued)

(52) U.S. Cl.
CPC ............ *C08F 214/22* (2013.01); *C08F 2/01* (2013.01); *C08F 2/10* (2013.01); *C08F 259/08* (2013.01);
(Continued)

(58) Field of Classification Search
CPC .. C08F 214/22; C08F 2/01; C08F 2/10; C08F 259/08; C09D 127/16; C08L 27/16; C08L 2205/025; C08L 2205/04
(Continued)

(56) References Cited

U.S. PATENT DOCUMENTS

| 4,076,929 A | 2/1978 | Dohany |
| 4,569,978 A | 2/1986 | Barber |

(Continued)

FOREIGN PATENT DOCUMENTS

EP  3115176 A1  11/2017

OTHER PUBLICATIONS

Tournut, C. In Modern Fluoropolymers, Schiers, J. Ed.; John Wiley & Sons : New York, 1997, p. 577. (specifically see pp. 577-585 for a general description of the synthesis.

*Primary Examiner* — Ling Siu Choi
*Assistant Examiner* — Ronald Grinsted
(74) *Attorney, Agent, or Firm* — Joanne Rossi

(57) ABSTRACT

The invention relates to a heterogeneous, co-continuous copolymer composition of vinylidene fluoride and at least one other comonomer. Preferred comonomers are hexafluoropropylene and perfluoroalkylvinyl ether. The co-continuous morphology is provide by first forming a first phase polymer, then adding one or more comonomers before half of the original monomer stream has been added, and at an effective level to cause phase separation of the copolymer. The co-continuous morphology provides a means for incorporating a high level of comonomer into the copolymer with little or no adverse effect on the melting temperature. The morphology also provides the copolymer composition with a unique combination of properties, including a high melting point, good flexibility and good low temperature impact resistance. The unique properties of the polymer make it (Continued)

useful in end-use application where those properties provide performance advantages, such as in the wire and cable market, and in oil and gas applications.

18 Claims, 9 Drawing Sheets

(51) Int. Cl.
  *C08F 2/10* (2006.01)
  *C08F 259/08* (2006.01)
  *C08L 27/16* (2006.01)
  *C09D 127/16* (2006.01)
(52) U.S. Cl.
  CPC ............ *C08L 27/16* (2013.01); *C09D 127/16* (2013.01); *C08L 2205/025* (2013.01); *C08L 2205/04* (2013.01)
(58) Field of Classification Search
  USPC ........................................................ 526/255
  See application file for complete search history.

(56) References Cited

U.S. PATENT DOCUMENTS

| | | | |
|---|---|---|---|
| 5,093,427 A * | 3/1992 | Barber | C08F 214/22 |
| | | | 525/276 |
| 5,429,849 A | 7/1995 | Lasson et al. | |
| 6,187,885 B1 | 2/2001 | Barber | |
| 6,310,141 B1 | 10/2001 | Chen et al. | |
| 7,863,384 B2 | 1/2011 | Durali et al. | |
| 2004/0001928 A1* | 1/2004 | Mekhilef | C08L 27/16 |
| | | | 428/36.9 |
| 2005/0222337 A1 | 10/2005 | Park | |
| 2007/0055020 A1* | 3/2007 | Park | C08J 3/24 |
| | | | 525/199 |
| 2008/0182953 A1 | 7/2008 | Wille et al. | |
| 2010/0283000 A1 | 11/2010 | Shimizu et al. | |
| 2011/0245421 A1 | 10/2011 | Dufaure et al. | |
| 2016/0368196 A1 | 12/2016 | Igarashi et al. | |

* cited by examiner

HETEROGENEOUS, CO-CONTINUOUS COPOLYMERS OF VINYLIDENE FLUORIDE

This application claims benefit, under U.S.C. § 119 or § 365 of PCT Application Number PCT/US2016/016710, filed Feb. 5, 2016; and U.S. Provisional Application No. 62/113,690, filed Feb. 9, 2015; said applications incorporated herein by reference.

FIELD OF THE INVENTION

The invention relates to a heterogeneous, co-continuous copolymer composition of vinylidene fluoride and at least one other co-monomer. Preferred co-monomers are hexafluoropropylene and perfluoro vinyl ether. The composition of this invention is produced by first forming a first-phase polymer, then adding one or more co-monomers before half of the original monomer stream has been added, to create a second-phase at an effective level to cause phase separation within the copolymer. The two phases are produced within a defined range to form a co-continuous morphological structure in the solid state. The co-continuous morphology provides a means for incorporating a high level of co-monomer into the copolymer with little or no adverse effect on the melting temperature. The co-continuous morphology also provides the copolymer composition with a unique combination of properties, including a high melting point, good flexibility, good tensile properties, improved rheological properties and good low temperature impact resistance. The unique properties of the polymer make it useful in end-use application where those properties provide performance advantages, such as in the wire and cable market, and in oil and gas applications.

BACKGROUND OF THE INVENTION

Polyvinylidene fluoride (PVDF) is a highly crystalline, chemically resistant engineering thermoplastic fluoropolymer having a typical useful temperature range from −15° C. up to 150° C. Although the glass transition temperature ($T_g$) for PVDF resins, which normally defines low temperature performance, is near −40° C., in practice, the useful low temperature range for PVDF under impact applications is higher than the Tg. PVDF resins becomes increasingly brittle as its glass transition temperature is approached resulting in poor low-temperature impact resistance. PVDF also loses its flexibility and becomes more rigid at these lower temperatures. It is generally recognized that PVDF resin's low temperature usefulness ranges between +5 and −15° C. Low temperature impact resistance and flexibility are especially important for pipes, hoses and other melt-processed articles used in cold climates.

Low temperature properties of PVDF can be improved by introducing co-monomers during polymer synthesis, to form PVDF copolymers. Copolymers of VDF and perfluoroalkyl vinyl ether (PAVE) have been synthesized as curable elastomers (U.S. Pat. No. 3,136,745) showing good low-temperature performance. Copolymers of vinylidene fluoride (VDF) and hexafluorpropylene (HFP) are shown in U.S. Pat. Nos. 4,076,929 and 4,569,978 to provide better low temperature performance. These copolymers are formed by adding the comonomer either to the initial charge, or at a constant level in a continuous mixed monomer feed to form random copolymers. The problem with these better low-temperature impact PVDF copolymers is that they also have significantly lower melting temperatures than PVDF homopolymers, reducing their useful temperature range.

One method used to optimize PVDF copolymer properties is to make a heterogeneous copolymer by altering the monomer feed during the polymerization, forming an initial polymer that is high in VDF monomer units, generally above 90 weight percent VDF, preferably above 95 weight percent, and in a preferred embodiment a PVDF homopolymer, then adding a co-monomer to the reactor at a point well into the polymerization to produce a copolymer. The VDF-rich polymer and copolymer, if properly selected and in sufficient quantity, will form distinct phases, resulting in an intimate heterogeneous copolymer.

A heterogeneous PVDF copolymer is one having two (or more) distinct phases, with a polyvinylidene fluoride rich phase, and a PVDF copolymer phase that is comonomer-rich. While the co-monomer-rich phase can be of any physical properties, in a preferred embodiment it has elastomeric properties, and will be referred to generally in this application as the "rubber phase", though the comonomer-rich phase could also be a non-rubber. These phases can form as a non-continuous structure (having discrete rubber domains) or, as surprisingly found in the present invention, as a co-continuous structure. A heterogeneous PVDF copolymer of the prior art will form discontinous, discrete individual rubber phase copolymer domains that are homogeneously distributed in PVDF-rich continuous phase. The co-continuous heterogeneous copolymer of the present invention is one having two (or more) continuous phases that are intimately intertwined with each other and cannot be physically separated.

U.S. Pat. No. 7,863,384 describes a heterogeneous copolymer having a PVDF continuous phase with non-continuos nano-domains of a VDF/HFP copolymer, The nano-domains have a domain size of 20-900 nm, and are refractive index mismatched to the continuous phase, to produce a whiter composition. The comonomer in this case is not added until after at least 90 percent of the VDF monomer has been fed to the reactor.

A heterogeneous copolymer of VDF and PAVE is described in U.S. Pat. No. 7,700,700. Initially only VDF monomer is fed to the reactor until 50 to 90 percent of the total VDF monomer has been fed, and then the total amount of perfluoroalkyl vinyl ether monomer is fed, followed by the remainder of the VDF monomer. The advantage of the heterogeneous polymer formed is that it has the good low-temperature impact properties of the VDF/PAVE copolymer, yet has a melting point much higher than the VDF/PAVE copolymer by itself.

Heterogeneous copolymers of vinylidene fluoride and hexafluoropropylene have been produced by a process in which the comonomer is introduced in the latter stages of the polymerization. (U.S. Pat. Nos. 5,093,427, 6,187,885). US '427 discloses a method in which the comonomer is not added until at least 50-90 percent of the VDF feed has been added, and thus the copolymer makes up a minor amount of the over-all copolymer composition, and exists in distinct "vinylidene fluoride-hexafluoropropylene domains". In the process of the US'427 patent, 1 to 20 weight percent of hexafluoropropylene is fed to the reactor, of which at most 83% is expected to become part of the copolymer. Although providing improved low temperature impact properties, these heterogenous copolymers tend to be relatively rigid due to the high PVDF homopolymer content which prevents use in applications requiring flexibility at room temperature.

There is a need for PVDF polymers having a combination of a high melting point for good melt processing, improved low temperature properties, and a lower flexural modulus than is found in the art. While other types of fluoropolymers could possibly meet the performance requirements of good low temperature properties and a higher melting point, they are far more costly, and much more difficult to process. There is a need for an alternative to these more costly fluoropolymers, such as fluorinated ethylene propylene (FEP), ethylene tetrafluoroethylene (ETFE), ethylene chloro-trifluoroethylene (ECTFE). These needs are met by the composition of the present composition.

Surprisingly it has now been found that heterogeneous PVDF copolymers having high melting points, and improved flexibility and low temperature impact properties can be formed by incorporating the co-monomer into the polymerization at a point between 25 and just under 50 weight percent of the VDF monomer has been added. This finding is surprising based on the disclosure of U.S. Pat. No. 5,093,427 that incorporating the co-monomer into the heterogeneous polymerization before about 50 weight percent of the VDF monomer has been added will depress the melting point. The present invention's earlier addition of the comonomer also allows higher levels of co-monomers such as HFP and PAVE to be incorporated into the copolymer composition, without any significant decrease in the melting point. Higher levels of HFP and PAVE provide better low temperature properties.

Property improvements are in part attributed to higher levels of rubber phase contained in the composition which can improve overall physical properties and surprisingly, also improves rheological characteristics effecting melt processability. The compositions of the present invention optimize the level of the rubber phase to provide unique properties. When the proportion of rubber phase in the total composition is low, the resultant product is semi-rigid, and exhibits less than optimal low temperature impact properties and less desirable rheological characteristics that can adversely affect melt extrusion processes. Conversely, when the proportion of rubber phase is too high, physical properties associated with toughness are adversely effected.

While not being bound by any particular theory, it is believed that the unique co-continuous nature of the copolymer provides a synergy between the separate but interconnected phases, and may have a positive effect on physical properties, including low temperature impact. Further, the co-continuous nature is thought to be responsible for the improved rheological properties. The presence of this co-continuous morphology in a PVDF copolymer is an observable attribute occurring in compositions of this invention.

In summary, by possessing a novel balance between a high VDF polymer phase and VDF copolymer phase, the co-continuous copolymers of the invention provide a unique balance of high and low temperature properties which are not easily attainable by other VDF-based copolymer systems.

SUMMARY OF THE INVENTION

The invention relates to a melt-processable heterogeneous copolymer composition comprising two or more co-continuous phases, wherein said co-continuous phases comprise:

a) from 25 to 50 weight percent of a first co-continuous phase comprising 90-100 weight percent of vinylidene fluoride monomer units and 0 to 10 weight percent of other fluoromonomers units, and b) from greater than 50 weight percent to 75 weight percent of a second co-continuous phase comprising from 65 to 95 weight percent of vinylidene fluoride monomer units and an effective amount of one or more co-monomers selected from the group consisting of hexafluoropropylene and perfluorovinyl ether to cause the second co-continuous phase to phase separate from the first continuous phase The invention also relates to a process for forming a melt-processable heterogeneous vinylidene fluoride copolymer composition having two or more co-continuous phases, comprising the steps of:

a) charging to a reactor an initial charge comprising water, surfactant, vinylidene fluoride, and an initiator;

b) initiating the polymerization;

c) feeding to the reactor a feed comprising vinylidene fluoride and initiator until 25 to less than 50 weight percent of the total weight of vinylidene fluoride to be used in the reaction has been fed to the reactor, to form a first-phase polymer;

d) adding to the reactor a fluoro-comonomer selected from the group consisting of hexafluoropropylene and perfluorovinylalkyl ether in an effective amount to cause the vinylidene fluoride copolymer formed as the second phase copolymer to phase separate from the first phase polymer;

e) continuing the feed of vinylidene fluoride and initiator until all of the vinylidene fluoride has been added to the reactor, to form a heterogeneous, co-continuous polyvinylidene copolymer composition; and f) removing the co-continuous polyvinylidene fluoride copolymer composition from the reactor.

The invention further relates to articles formed from the melt-processable heterogeneous copolymer composition.

DETAILED DESCRIPTION OF THE INVENTION

Figure 1:
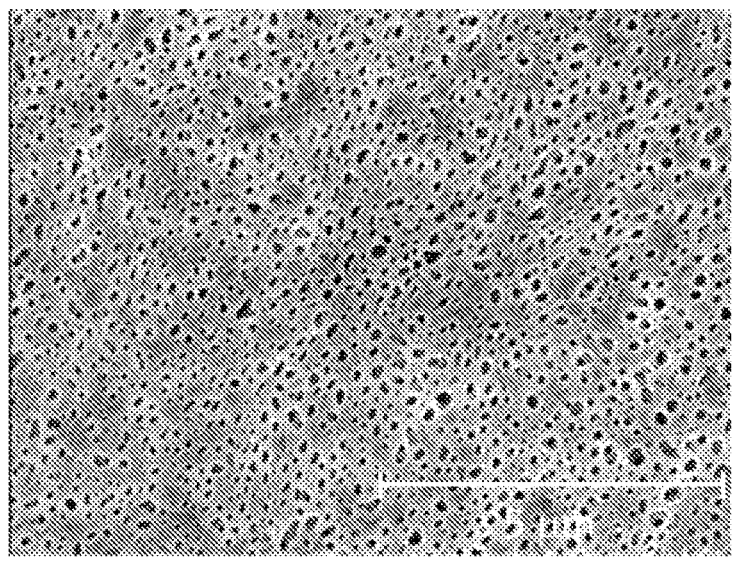
FIG. 1: Comparative, is an SEM of a heterogeneous copolymer based on Comparative Example 1, having distinct copolymer domains dispersed in a PVDF homopolymer matrix.

The invention relates to a heterogeneous copolymer of vinylidene fluoride and hexafluoropropylene, having high levels of vinylidene fluoride-hexafluoropropylene copolymer phase content, and a co-continuous morphology. The invention also relates to a process for forming the novel heterogeneous fluoropolymer, and uses of the fluoropolymer.

All documents and patents cited herein are incorporated by reference. Unless otherwise noted, all percentages are weight percentages, and all molecular weights are weight average molecular weight as determined by gel permeation chromatography (GPC).

By "melt-processable" as used herein means that the heterogeneous copolymer can be converted into usable goods by a process involving heating, melting, forming and cooling of the copolymer. Typical melt processes include, but are not limited to injection molding, extrusion, blow molding, etc.

The heterogeneous copolymer of the invention contains two or more phases that produce a co-continuous structure in the solid state. Attributes of this co-continuous structure such as domain size and shape vary with composition of this invention and are mostly dependent on total copolymer content and composition. The co-continuous phases are distinct from each other, and can be seen in a scanning electron microscope (SEM) images as in FIGS. 4-7.

PVDF heterogeneous copolymers not of this invention contain two or more phases consisting of a discrete phase, normally a rubber phase, contained within a continuous phase, normally a homopolymer phase. The discrete phase is most often observed as a dispersed round, oblong, or in some cases, globular structures, typically of similar size, but in some cases can vary in size, and also of varying concentrations within the composition. The transition from a discrete phase to a co-continuous phase happens when a sufficient amount of discrete phase is present allowing for coalescence into a continuous phase. This transition occurs at the boundary of this invention. The discrete phases can be seen in a scanning electron microscope (SEM) images in FIGS. 1 and 2.

PVDF homogeneous copolymers as well as homopolymers are not of this invention and will exhibit only a single phase independent of composition. The single phase can be seen in a scanning electron microscope (SEM) image in FIG. 3.

The first co-continuous phase is rich in vinylidene fluoride monomer units, containing at least 90 weight percent, and preferably at least 98 weight percent of vinylidene fluoride monomer units. In one embodiment, the first co-continuous phase is a homopolymer of polyvinylidene fluoride (PVDF). If the first co-continuous phase is a copolymer, it can be formed from one or more other fluoromonomers chosen from the group tetrafluoroethylene, trifluoroethylene, chlorotrifluoroethylene, hexafluoropropene, vinyl fluoride, pentafluoropropene, perfluoromethyl vinyl ether, perfluoropropyl vinyl ether. If the fluoro-comonomer is the same as the primary co-monomer in the second co-continuous phase, then no more than 10% of that co-monomer can be present in the first co-continuous phase, since the polymers in the phases must be different enough to thermodynamically form separate phases. In one embodiment, the difference in the level of a common co-monomer between the first and second phase copolymers should be at least 10 percent absolute.

The final copolymer composition contains from 25 to 50 weight percent of the first co-continuous phase polymer, preferably from 30 to 50, and more preferably from 35 to 48 weight percent, and correspondingly from just over 50 to 75 weight percent, preferably greater than 50 to 70 and more preferably 52 to 65 weight percent of a second co-continuous phase copolymer.

The second phase containing a copolymer will thermodynamically separate from the first phase to form a heterogeneous composition having a co-continuous structure. The copolymer contains an effective amount of a co-monomer chosen from hexafluropropylene (HFP) and perfluroalkyl ether (PAVE), chlorotrifluoro ethylene (CTFE), trifluoroethylene, with a majority (greater than 50 weight percent) of vinylidene fluoride monomer units. Preferably the second co-continuous phase contains at least 1 percent by weight of HFP or PAVE. The copolymer may also contain other co-monomers that are co-polymerizable with VDF.

The effective amount of co-monomer is one that allows the copolymer to form a distinct separate phase from the first phase polymer. F When HFP, is the comonomer an effective amount in the second-phase polymer is from 5 to 35 weight percent, preferably 15 to 33 weight percent, and more preferably from 26 to 31 weight percent The perfluoro alkyl ethers useful in the invention are those having the structure: $CF_2=CF-O-R_f$, where $R_f$ is one or more perfluoroalkyl groups selected from $-CF_3$, $-CF_2CF_3$, and $-CF_2CF_2CF_3$. A preferred perfluoroalkyl vinyl ether is perfluoromethyl vinyl ether.

The final co-continuous copolymer composition contains from 2.5 to 31 weight percent of HFP and/or PAVE, more preferably from greater than 2.5 to 26 weight percent, and more preferably 13 to 23 weight percent, based on the total amount of all monomers fed to the reactor.

The copolymer composition containing both the first and second co-continuous phases together typically has a melt viscosity of 1 to 32 Kpoise as measured according to ASTM method D3835 measured at 450° F. and 100 $sec^{-1}$. The higher molecular weight copolymers tend to be tougher and have advantages in low temperature impact, however lower melt viscosity copolymer is useful in some application by allowing for higher speed melt processing.

Process

The process of the invention will be illustrated with reference to a first phase that is a PVDF homopolymer, and a second phase that is a copolymer of VDF and HFP. One of ordinary skill in the art can easily substitute a VDF-rich mixture of VDF monomer and other fluoro-co-monomers for the PVDF homopolymer, and other comonomers for the HFP, as described above, to produce other embodiments of the present invention.

The heterogeneous copolymer composition is conveniently made by an emulsion polymerization process, but could also be synthesized by a suspension, solution, or supercritical $CO_2$ process. The vinylidene fluoride monomer is fed continuously until between 25 and just under 50 percent, preferably from 30 to 48 weight percent, and more preferably 35 to 45 weight percent of the total weight of the vinylidene fluoride has been fed to the reactor, and then the total amount of co-monomer is fed to the reactor, followed by the remainder of the vinylidene fluoride.

A typical emulsion polymerization process consists of the following steps:
(a) A reactor is charged with deionized water, surfactant, optionally an antifoulant, optionally a buffering agent, and optionally a molecular weight regulator in any convenient order to form an aqueous mixture,
(b) Air is removed from the reactor;
(c) Heat and agitation sufficient to effect polymerization are provided;
(d) The reactor is brought to reaction pressure with vinylidene fluoride;
(e) A radical initiator is added to begin the polymerization;
(f) The polymerization is continued by feeding vinylidene fluoride to maintain reaction pressure as desired, and additional initiator, heat, and agitation are used as needed to continue the progress of reaction;
(g) After an amount chosen to be between 25 to just under 50 percent of the total planned charge by weight of vinylidene fluoride has been fed to the reactor, hexafluoropropylene monomer is fed to the reactor in an amount that will yield the desired final chosen polymer composition. The hexafluoropropylene is charged over a short period of time, to maximize the incorporation of this slower reacting monomer into the copolymer;

(h) The remainder of the total planned charge of vinylidene fluoride is fed to the reactor;

(i) A post feeding period may optionally be used to consume residual monomer after the monomer feeds are stopped. The post feeding period may include some further additions of some reaction components, such as the addition of more radical initiator to help consume residual monomers;

(j) The reactor is vented of surplus gas;

(k) The addition points of the molecular weight regular, buffering agent, and radical initiator may optionally occur at any time during the initial filling of the reactor, during the reaction, or during the post-feeding period, so that desired molecular weight profiles, acidity profiles, and process rates may be obtained. Removal of air, addition of surfactant, addition of antifoulant, the application of heat and agitation may optionally be at different points before the polymerization begins so that reaction start-up may be optimized for the equipment used;

(l) After the reaction is complete, the copolymer composition may be used in the form of a latex or the composition may optionally be isolated from the remainder of the reaction mixture by known separation methods such as by salt addition, by mechanical separation, or by drying;

(m) The isolated copolymer composition may optionally be further purified, such as by washing, and dried to a powder, and optionally further processed into a convenient form such as into pellets;

(n) The copolymer composition may be used to form coatings, or be processed, such as by a melt process, into a sheet, film, profile, or final articles.

Surfactants useful in the invention include halogenated and non-halogenated surfactants known to be useful for the (co)polymerization of vinylidene fluoride and perfluoroalkyl vinyl ethers. Examples of useful surfactants are partially fluorinated and perfluorinated carboxylic acid salts, described in U.S. Pat. No. 2,559,752; siloxane surfactants, as described in U.S. Pat. No. 6,841,616B2; 3-allyloxy-2-hydroxy-1-propanesulfonic acid salt surfactant, described in U.S. Pat. No. 6,869,997B2; alkyl sulfonate surfactant, described in US20050239983A1; alkyl phosphonic acid its salts (U.S. Pat. No. 8,124,694); polyvinyl phosphonic acid, polyacrylic acid and polyvinylsulfonic acid (U.S. Pat. No. 8,697,822); and non-ionic surfactants containing polyethylene glycol, polypropylene glycol and tetramethylene glycol (U.S. Pat. Nos. 8,080,621, 8,765,890, and 8,158,734). In one preferred embodiment, the polymer formed is fluorosurfactant-free, meaning that no fluoro-surfactants are used in making or processing the polymer. The surfactant charge is from 0.05% to 2% by weight on the total monomer weight used, and most preferably the surfactant charge is from 0.1% to 0.2% by weight. Normally the surfactant is added during the initial filling of the reactor, but some portion may also be added after the reaction has begun. Surfactant may also be added as the reaction progresses if needed for further stabilization.

A paraffin antifoulant is optionally used in the polymerization. Any long-chain, saturated, hydrocarbon wax or oil may be used. The oil or wax is added to the reactor prior to formation of fluoropolymer, in an amount sufficient to minimize the formation of polymer adhesions to the reactor components. This amount is generally proportional to the interior surface area of the reactor and may vary from about 1 to about 40 mg/cm$^2$ of reactor interior surface area. If a paraffin wax or hydrocarbon oil is used as the antifoulant, the amount used is typically about 5 mg/cm$^2$ of the reactor interior surface area.

The polymerization reaction mixture may optionally contain a buffering agent to maintain a controlled pH during the polymerization reaction. The pH is typically controlled within the range of from about 3 to about 8, to minimize undesirable color development in the product. The buffering agent may be added all at the beginning, at different points, or throughout the polymerization. Suitable exemplary buffering agents are phosphate buffers and acetate buffers, which are well known in the art.

Molecular weight regulators, also called chain-transfer agents, may optionally be used to adjust the molecular weight profile of the product. They may be added in a single portion at the beginning of the reaction, incrementally, or continuously throughout the reaction. The amount of molecular weight regulator added to the polymerization reaction is typically from about 0.05 to about 5 wt %, more typically from about 0.1 to about 2 wt % based on the total weight of monomer added to the reaction mixture. Oxygenated compounds such as alcohols, carbonates, ketones, esters, and ethers may serve as molecular weight regulators. Examples of suitable oxygenated compounds include isopropyl alcohol, acetone, ethyl acetate, and diethyl carbonate. Other classes of molecular weight regulators include halogenated compounds such as chlorocarbons, hydrochlorocarbons, hydrofluorocarbons, chlorofluorocarbons, and hydrochlorofluorocarbons. Particular examples of halogenated molecular weight regulators include 1-fluoroethane, trichlorofluoromethane, and 1,1-dichloro-2,2,2-trifluoroethane. Some hydrocarbons may be used as molecular weight regulators, such as hydrocarbons that contain two to five carbon atoms, with ethane and propane as particular examples.

The radical initiator may be one or a combination of more than one of the initiators known in the art to be useful in the emulsion polymerization of halogenated monomers. Suitable non-limiting classes of initiators include persulfate salts, peroxides, and redox systems. Examples of persulfate salts are sodium persulfate, potassium persulfate, or ammonium persulfate. The amount of persulfate salt added to the reaction mixture based on the total weight of monomer added to the reaction mixture is typically from about 0.005 to about 1.0 wt percent. Organic peroxides that are useful include dialkyl peroxides, alkyl hydroperoxides, peroxy esters, and peroxydicarbonates. A suitable exemplary dialkyl peroxide is di-tert-butyl peroxide. Suitable exemplary peroxy esters include tert-amyl peroxypivalate, tert-butyl peroxypivalate, and succinic acid peroxide. Suitable exemplary peroxydicarbonate initiators include di-n-propyl peroxydicarbonate and diisopropyl peroxydicarbonate, which are typically added to the reaction mixture in an amount based on the total weight of monomer added to the reaction mixture of about 0.5 to about 2.5 wt percent.

The radical initiator may comprise a redox system. By "redox system" is meant a system comprising an oxidizing agent, a reducing agent, and optionally a promoter that acts as an electron transfer medium. The promoter is a component that, in different oxidation states, is capable of reacting with both the oxidant and the reducing agent, thereby accelerating the overall reaction. Oxidizing agents include, for example, persulfate salts; peroxides, such as hydrogen peroxide; hydroperoxides, such as tert-butyl hydroperoxide and cumene hydroperoxide; and oxidizing metal salts such as, for example, ferric sulfate and potassium permanganate. Exemplary reducing agents include sodium formaldehyde sulfoxylate; sodium or potassium sulfite, bisulfite, or metabisulfite; ascorbic acid; oxalic acid; and reduced metal salts. Typical promoters include transition metal salts such as ferrous sulfate. In redox systems, the oxidizing agent and the reducing agent are typically utilized in an amount from about 0.01 to about 0.5 wt % based on the total weight of monomer added to the reaction mixture. The promoter, if used, is typically employed in an amount from about 0.005 to about 0.025 wt % based on the total weight of monomer added to the reaction mixture.

Air may be removed by evacuation and filling with inert gas, by purging with inert gas, or by heating the reaction medium to the boiling point of water while venting the reactor.

Preparation of fluoropolymers and copolymers is typically performed in a pressurized reactor equipped with an efficient agitation system, using equipment known in the art. The pressure used for polymerization may be selected from a wide range of pressures, from about 280 to about 20,000 kPa, depending on the capabilities of the reaction equipment, the initiator system chosen, and the monomer composition used. The polymerization pressure is typically from about 2,000 to about 11,000 kPa, and most typically from about 2,750 to about 6,900 kPa. The pressure may be adjusted during the reaction to control the process rate and molecular weight profile. The polymerization temperature may vary from about 20° C. to about 160° C., depending on the initiator system chosen, and is typically from about 35° C. to about 130° C., and most typically from about 65° C. to about 95° C. The temperature may also be adjusted during the reaction to control the process rate, initiator efficiency, and product characteristics.

The monomers are fed so that a substantial amount of polyvinylidene fluoride is formed in the reactor before any hexafluoropropylene is introduced as a co-monomer. Vinylidene fluoride is fed to the reactor to bring the reactor to pressure, and the polymerization is begun using a radical initiator. The reaction is maintained by adding more vinylidene fluoride as necessary to maintain reactor pressure, and also optionally adding more initiator, if needed, to keep the reaction going. The mode of initiator addition depends on the initiator used, the reaction temperature, and the molecular weight characteristics desired. Once between 25 to just under 50 percent by weight of the total planned charge of vinylidene fluoride has been fed to the reactor, the feed of hexafluoropropylene comonomer is begun. The rate of addition depends on the capabilities of the reactor equipment and the overall desired process rate, and it is typically made to maintain an efficient process rate which has been established during the vinylidene fluoride addition up to the point of hexafluoropropylene addition. Depending on the rate of hexafluoropropylene addition, some concurrent vinylidene fluoride addition may be required to maintain reaction pressure. After the hexafluoropropylene co-monomer addition is completed, any remaining vinylidene fluoride planned charge is fed to the reactor until the total planned charge has been fed. The amount of hexafluoropropylene that is fed to the reactor is an amount that will yield a final product composition having 70-98 weight percent vinylidene fluoride units, and having a total of 2 to 30 weight percent of hexafluoropropylene units in the whole co-continuous copolymer composition.

The copolymer formed by the process of the invention has a unique morphology, and composition, providing a useful combination of properties. The copolymer is co-continuous, with the first and second phases each being continuous and intertwining, to form a twisted polymer web, much like an interpenetrating polymer network. The phases are intimate and cannot be physically separated, and thus the properties of the copolymer as a whole are in some respects the best of each separate phase. The phases are not cross-linked. The co-continuous structure provides an even better synergy between the phases than a heterogeneous copolymer having a continuous matrix with isolated separate copolymer domains. The higher level of co-monomer (HFP) that can be incorporated due to the earlier addition point provides better flexibility and impact properties than when the co-monomer is added at a latter point in the polymerization.

A key aspect of the invention is that the phases are stable and found to be relatively unchanged after repeated melt processing steps ensuring property stability independent of thermal or process history. The creation of a heterogeneous structure requires that the two individual phases are sufficiently incompatible with each other resulting in phase separation. Due to the need for phase incompatibility to produce a heterogeneous structure, desirable properties cannot be assumed, and in many cases, such as with blends of incompatible polymers, product instability is observed resulting in either poor or unstable properties. In the present invention, the separation of the individual phases which in literature is often described as spinodal decomposition (attributed to polymer phase immiscibility) was found to produce a consistent and stable morphology.

The copolymer composition of the invention has a higher melting point than random homogeneous copolymers of the same composition, with PVDF/HFP homogenous copolymers having a melting point of 130 to 140° C. dependent on composition, while the heterogeneous copolymer has a melting point of from 150° C. to 175° C., preferably from 155° C. to 170° C., and preferably from 158° C. to 170° C., independent of composition.

The heterogeneous copolymer composition having a co-continuous structure exhibits a faster relaxation response and better rheological properties compared to PVDF heterogeneous copolymers having a non-continuous structure. This is helpful in higher speed melt extrusion processes often encountered during wire & cable and tube manufacture.

With the early incorporation of HFP into the copolymer, the final composition has a lower flexural modulus providing increased flexibility in articles produced. The co-continuous structure provides a higher loss modulus that tends to improve the overall "feel" of the composition when used as a cable jacket, for example. Low-temperature impact resistance is found to be improved further as seen in a lower ductile-brittle transition temperature (DBTT) as determined using several methodologies.

An important property of the high HFP copolymers of the invention is that they are melt processable.

Uses

The unique properties of the heterogeneous copolymer of the invention make them especially useful in several final applications. These include, but are not limited to the wire & cable market, oil & gas market, and the food and beverage tubing market. The polymer of the invention can be formulated with additives commonly used in polymer compounding for specific end uses, including but not limited to, plasticizers, antioxidants, flame retardants, fillers, fibers, thermal stabilizers, waxes, lubricants, metal oxides, colorants, conductive fillers, antistatics, and antimicrobial agents.

Wire and cable uses, including but not limited to jackets, primary insulation layer, buffer layer, tubes strength member, etc., and especially for jacketing fiber optic cable, requires the water-proofing and weather and chemical resistance found in PVDF polymers, but simultaneously needs good low temperature impact resistance (for outdoor use to at least −20° C.), and good flexibility that comes with a "softer" polymer. Ideally, the industry also desires products having melting temperatures in excess of 155° C., which allows the cable products to achieve a 150° C. temperature rating without cross-linking per UL specifications as mandated in several applications including but not limited to plenum, military and industrial. The copolymer of the invention meets these requirements. The copolymer is also useful in heat-shrink wire and cable applications.

Other useful applications of the copolymer composition of the invention include:
1. Other wire and cable applications (fiber optic, plenum, non-plenum)
2. Oil and gas uses—such as off shore umbilicals and risers, tank liners, cables
3. Applications currently met with a softer fluoropolymers, including but not limited to tubing, films, sheets, rods, polymer processing agents (PPA), fibers, and molded products (including gaskets).
4. As an additive to improve flexibility and performance of other PVDF products.
5. As a foamed article.
6. Use in filtration membranes.
7. Use in as battery separator.
8. For coextruded tubing and other articles as the contact layer with corrosive materials such as fuels in a motor vehicle.
9. For coextruded tubing, bags and containers for sterile uses, such as bags for sera, blood, plasma, etc.; for pharmaceutical production and distribution; food and beverage contact, and biological applications.
10. Corrosion resistant powder coatings for metal substrates.
11. Extruded sheet linings for tank fabrication on metal or as a dual laminate.

EXAMPLES

The SEM images provided have been produced using samples prepared after a solvent extraction process for removal of the rubber phase. In all these images, being viewed is what remains after removal of the rubber phase from the solvent extraction process. The steps involved in preparing the samples is described as follows:
  a. Cutting a solid polymer sample with a band saw (Southbay Technologies, model 865) into rectangular pieces, 8 to 12 mm long, and with lateral dimensions of 2 to 3 mm
  b. Placing the polymer sample into the sample holder (Boeckeler Instruments) of a microtome instrument.
  c. Cut the sample top into a four sided pyramid with an apex to base distance of 3 to 5 mm using a glass knife (Alkar, Sweden).
  d. Cryomicrotoming the sample using a Cryomicrotome instrument (Boeckeler Instruments, Powertome CRX with CRX cryomicrotome unit) using glass and diamond knives at −120° C. A glass knife is used to make parallel slices from the sample apex down to 0.5 to 0.8 mm below the apex (1 to 10 micrometer slices) followed by a diamond knife (Diatome, model histo-cryo) used to remove two 1 micrometer thick slices, two 250 nm thick slices, and one 100 nm thick slice.
  e. The sample is taken out of the microtome holder and allowed to dry at room temperature until water condensation is no longer visible and is then immersed into acetone for 10 hours at room temperature using a suitable glass vessel.
  f. After 10 hours of immersion, the sample is taken out of the acetone solution and left to dry at room temperature for one hour before SEM analysis.

The SEM images shown in FIGS. 1-9 were captured at either 10,000 times or 15,000 times magnification NMR Description:
Copolymer compositions were determined by $^{19}$F NMR by first dissolving the resin sample in a solvent mixture of triethylphosphite and tetrahydrofuran-d8. Solution $^{19}$F NMR spectra were acquired at 50° C. on a Bruker AV III HD 500 MHz spectrometer (11.7 T) equipped with a 5 mm $^{1}$H/$^{19}$F/$^{13}$C TXO probe. From the spectra, the molar ratios of HFP and VDF were then determined by comparing the integrals of the $CF_3$ and $CF_2$ signals. Weight fractions were then calculated by multiplying the molar ratios by the respective monomer molecular weights.

DSC Description:
Polymer melting points were determined by differential scanning calorimetry (DSC). Resin samples were heated, cooled, and reheated at 10° C./min from −20° C. to 210° C. The melting point was taken to be the peak temperature value of the melting transition during the second heating cycle.

Comparative 1—(Too Late Addition)
Into a 2-gallon stainless steel reactor was charged 4303.8 g of deionized water, 3.2 g of a polyethylene glycol nonionic surfactant, and 17.9 g of ethyl acetate. Following a 30 minute purge with nitrogen, agitation was begun and the reactor heated to 90.5° C. Once the reaction temperature was reached, 374.0 g of vinylidene fluoride (VDF) monomer was added. Upon stabilization of the temperature and operating pressure, 53.7 g of potassium persulfate (KPS) solution in the form of a 1 wt % aqueous solution containing 1 wt. % sodium acetate was added to begin the polymerization. The polymerization was continued by addition of the above KPS solution, at a rate of 51.6 g/h and VDF monomer, at such a rate to maintain the reaction pressure. The VDF homopolymerization reaction was continued until approximately 1388 (representing 77.2% of the VDF utilized in the example) was added to the reaction mass. Thereafter, 337.4 g of hexafluoropropylene (HFP) (comprising 15.8% of the weight of VDF and HFP monomers used in the herein example) was pumped into the reactor at a rate of approximately 940 g per hour, while the VDF feed was continued. The reaction continued until a total of 1798.2 g of VDF had been added to the reaction mass. The batch was allowed to react-out at a constant temperature of 90.5° C., with continued KPS solution feed to consume residual monomers at decreasing pressures. After 30 minutes, the agitation and all feeds were stopped and the reactor was vented, and the latex recovered. The residual contents of the reactor rinsed into the latex using 585.0 g deionized water. The polymer resin was isolated by drying in a forced air oven at 80° C. for 24 to 48 hours. The resin displayed a melt viscosity of 9.8 Kpoise, measured at 232° C. at 100 sec$^{-1}$ (ASTM D3835), a DSC melting point of 159 to 160° C., and an HFP content of 9.9% (based on total dry resin weight), as determined by $^{19}$F NMR. The SEM is shown in FIG. 1, and shows a non-continuous copolymer phase. This comparative example shows that heterogeneous PVDF/HFP copolymers, containing intermediate levels of HFP, which was added to the reaction mass after about 75% the VDF has been polymerized, as described in U.S. Pat. No. 5,093,427, show discrete, non-co-continuous phase morphology.

Comparative 2 (Too Late Addition)

Figure 2:
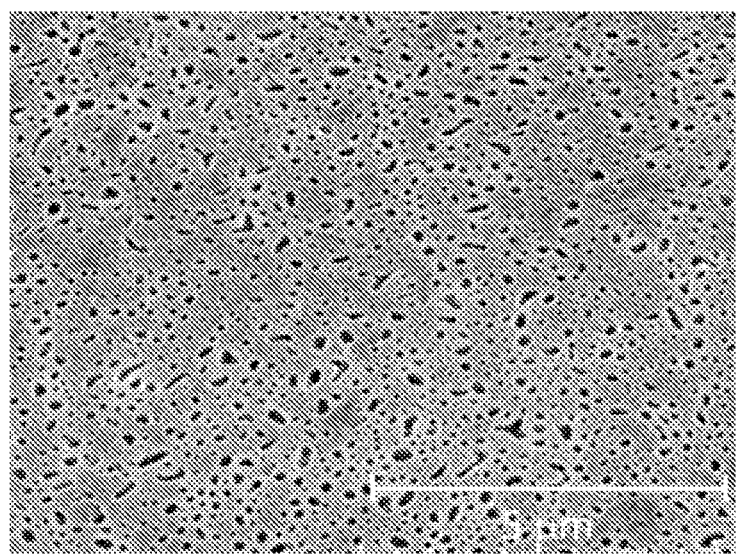
FIG. 2: Comparative, is an SEM of a heterogeneous copolymer based on Comparative Example 2, having distinct copolymer domains dispersed in a PVDF homopolymer matrix.

This example was prepared according to the procedure described for Comparative 1, except that the hexafluoropropylene (422.8 g, comprising 19.8% of the total VDF and HFP used in the herein example) was added when approximately 1025 g of VDF (representing 59.8% of the VDF utilized in the example) was added to the reaction mass. The reaction continued until a total of 1712.8 g of VDF had been added to the reaction mass. The resin displayed a melt viscosity of 10.5 Kpoise, measured at 232° C. at 100 sec$^{-1}$ (ASTM D3835), a DSC melting point of 159 to 160° C., and an HFP content of 14.1% (based on total dry resin weight), as determined by $^{19}$F NMR. The SEM is shown in FIG. 2, and shows a non-continuous copolymer phase. This comparative example shows that heterogeneous PVDF/HFP copolymers, containing high levels of HFP, which was added to the reaction mass after about 60% of the VDF has been polymerized, as described in U.S. Pat. No. 5,093,427, show discrete, non-co-continuous phase morphology.

Comparative 3

Figure 3:
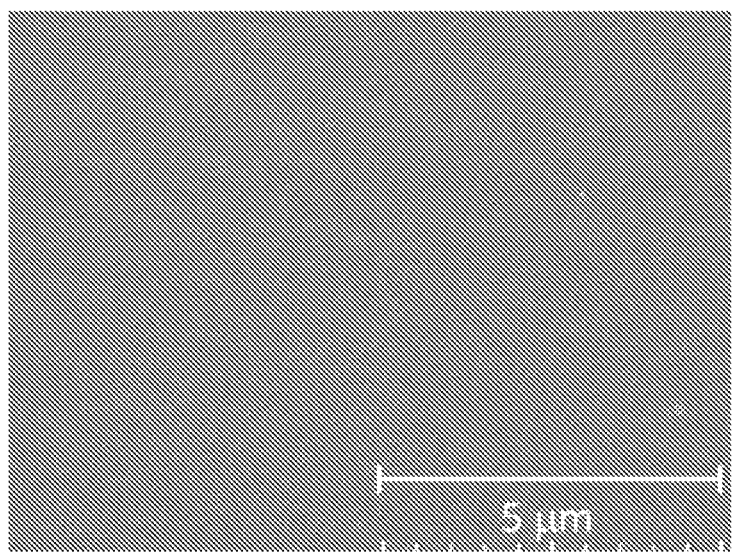
FIG. 3: Comparative, is an SEM of the homogeneous copolymer of Comparative Example 3.

A homogeneous (non-heterogeneous) copolymer having essentially no PVDF homopolymer content was prepared according to the examples described in U.S. Pat. No. 8,080,621, using a ratio feed of VDF/HFP fed continuously throughout the process. The final resin displayed a melt viscosity of 25.0 Kpoise, measured at 232° C. at 100 sec$^{-1}$ (ASTM D3835), a DSC melting point of 143 to 144° C., and an HFP content of 10.3% (based on total dry resin weight), as determined by $^{19}$F NMR. The SEM is shown in FIG. 3, and shows a uniform, featureless, non-co-continuous phase morphology. This comparative example shows that homogeneous (non-heterogeneous) PVDF/HFP copolymers, containing intermediate levels of HFP, which was added to the reaction mass continuously throughout the process, as described in U.S. Pat. No. 8,080,621, show uniform, featureless, non-co-continuous phase morphology.

Example 1

Figure 4:
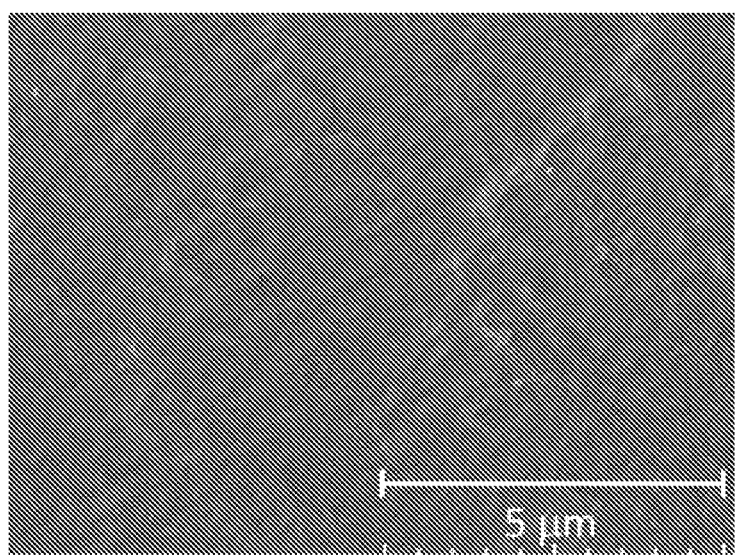
FIG. 4: Is an SEM of Example 1 of the invention, showing a co-continuous morphology.

Into a 2-gallon stainless steel reactor was charged 4303.8 g of deionized water, 3.2 g of a polyethylene glycol nonionic surfactant, and 17.9 g of ethyl acetate. Following a 30 minute purge with nitrogen, agitation was begun and the reactor heated to 90.5° C. Once the reaction temperature was reached, 374.0 g of vinylidene fluoride (VDF) monomer was added. Upon stabilization of the temperature and operating pressure, 90.0 g of potassium persulfate (KPS) solution in the form of a 1 wt % aqueous solution containing 1 wt. % sodium acetate was added to begin the polymerization. The polymerization was continued by addition of the above KPS solution, at a rate of 51.6 g/h and VDF monomer, at such a rate to maintain the reaction pressure. The VDF homopolymerization reaction was continued until approximately 939.7 g (representing 46.3% of the VDF utilized in the example) was added to the reaction mass. Thereafter, 106.8 g of hexafluoropropylene (HFP) (comprising 5.0% of the weight of VDF and HFP monomers used in the herein example) was pumped into the reactor at a rate of approximately 941 g per hour, while the VDF feed was continued. The reaction continued until a total of 2028.8 g of VDF had been added to the reaction mass. The batch was allowed to react-out at a constant temperature of 90.5° C., with continued KPS solution feed (67.0 g/h) to consume residual monomers at decreasing pressures. After 30 minutes, the agitation and all feeds were stopped and the reactor was vented, and the latex recovered. The residual contents of the reactor rinsed into the latex using 585.0 g deionized water. The polymer resin was isolated by drying in a forced air oven at 80° C. for 24 to 48 hours. The resin displayed a melt viscosity of 12.5 Kpoise, measured at 232° C. at 100 sec$^{-1}$ (ASTM D3835) and a DSC melting point of 163° C., and an HFP content of 3.6% (based on total dry resin weight), as determined by $^{19}$F NMR. The SEM is shown in FIG. 4, and shows a co-continuous copolymer phase. This example shows that heterogeneous PVDF/HFP copolymers, containing low levels of HFP, which was added to the reaction mass after about 45% of the VDF has been polymerized, show finely-featured co-continuous phase morphology.

Example 2

Figure 5:
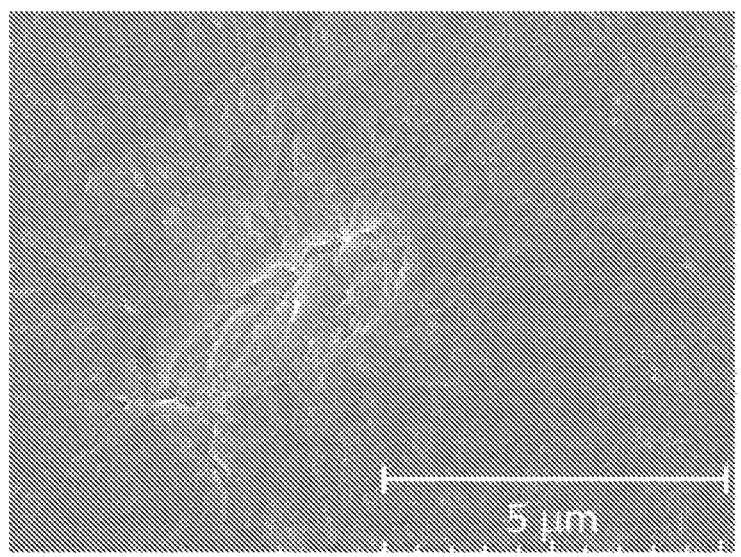
FIG. 5: Is an SEM of Example 2 of the invention, showing a co-continuous morphology.

This example was prepared according to the procedure described for Example 1, except that the hexafluoropropylene (106.8 g, comprising 5.0% of the total VDF and HFP used in the herein example) was added when approximately 534 g of VDF (representing 26.3% of the VDF utilized in the example) was added to the reaction mass. The reaction continued until a total of 2028.8 g of VDF had been added to the reaction mass. The resin displayed a melt viscosity of 13.4 Kpoise, measured at 232° C. at 100 sec$^{-1}$ (ASTM D3835) and a DSC melting point of 159 to 160° C., and an HFP content of 4.1% (based on total dry resin weight), as determined by $^{19}$F NMR. The SEM is shown in FIG. 5, and shows a co-continuous copolymer phase. This example shows that heterogeneous PVDF/HFP copolymers, containing low levels of HFP, which was added to the reaction mass after about 25% of the VDF has been polymerized, show finely-featured co-continuous phase morphology.

Example 3

Figure 6:
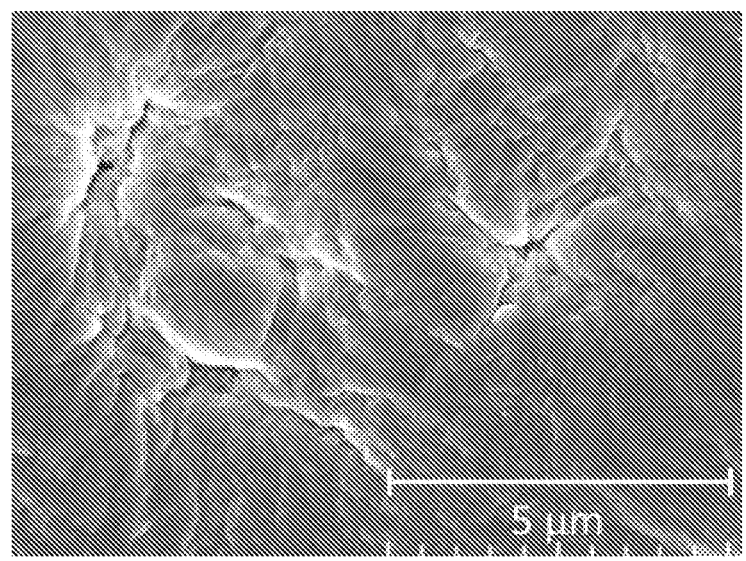
FIG. 6: Is an SEM of Example 3 of the invention, showing a co-continuous morphology.

This example was prepared according to the procedure described for Example 1, except that the hexafluoropropylene (213.5 g, comprising 10.0% of the total VDF and HFP used in the herein example) was added when approximately 534 g of VDF (representing 27.8% of the VDF utilized in the example) was added to the reaction mass. The reaction continued until a total of 2028.8 g of VDF had been added to the reaction mass. The resin displayed a melt viscosity of 14.5 Kpoise, measured at 232° C. at 100 sec$^{-1}$ (ASTM D3835) and a DSC melting point of 159° C., and an HFP content of 8.3% (based on total dry resin weight), as determined by $^{19}$F NMR. The SEM is shown in FIG. 6, and shows a co-continuous copolymer phase. This example shows that heterogeneous PVDF/HFP copolymers, containing intermediate levels of HFP, which was added to the reaction mass after about 25% of the VDF has been polymerized, show finely-featured co-continuous phase morphology.

Example 4

Figure 7:
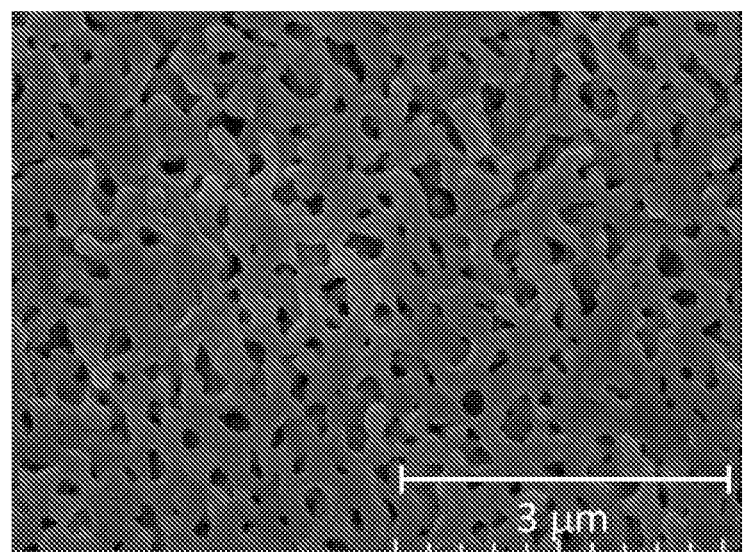
FIG. 7: Is an SEM of Example 4 of the invention, showing a co-continuous morphology.

This example was prepared according to the procedure described for Example 1, except that the hexafluoropropylene (422.8 g, comprising 19.8% of the total VDF and HFP used in the herein example) was added when approximately 500 g of VDF (representing 29.2% of the VDF utilized in the example) was added to the reaction mass. The reaction continued until a total of 1712 g of VDF had been added to the reaction mass. The resin displayed a melt viscosity of 8.9 Kpoise, measured at 232° C. at 100 sec$^{-1}$ (ASTM D3835) and a DSC melting point of 154° C. The SEM is shown in FIG. 7, and shows a co-continuous copolymer phase. This example shows that heterogeneous PVDF/HFP copolymers, containing high levels of HFP, which was added to the reaction mass after about 30% of the VDF has been polymerized, can be prepared, and have high melting points.

Example 5

Figure 8:
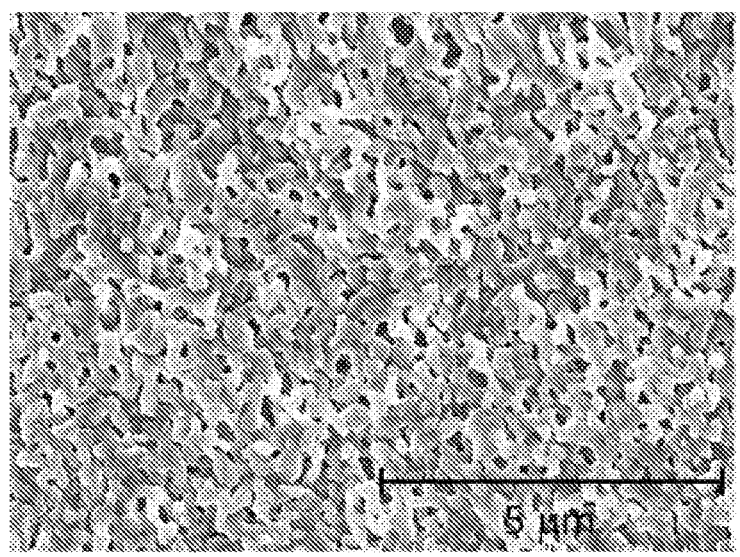
FIG. 8: Is an SEM of Example 5 of the invention, showing a co-continuous morphology.

This example was prepared according to the procedure described for Example 1, except that the hexafluoropropylene (422.8 g, comprising 19.8% of the total VDF and HFP used in the herein example) was added when approximately 800 g of VDF (representing 46.7% of the VDF utilized in the example) was added to the reaction mass. The reaction continued until a total of 1712.8 g of VDF had been added to the reaction mass. The resin displayed a melt viscosity of 9.0 Kpoise, measured at 232° C. at 100 sec$^{-1}$ (ASTM D3835) and a DSC melting point of 159 to 160° C., and an HFP content of 16.1% (based on total dry resin weight), as determined by $^{19}$F NMR. The SEM is shown in FIG. 8, and shows a co-continuous copolymer phase. This example shows that heterogeneous PVDF/HFP copolymers, containing high levels of HFP, which was added to the reaction mass after about 45% of the VDF has been polymerized, show co-continuous phase morphology having large features.

Example 6

Figure 9:
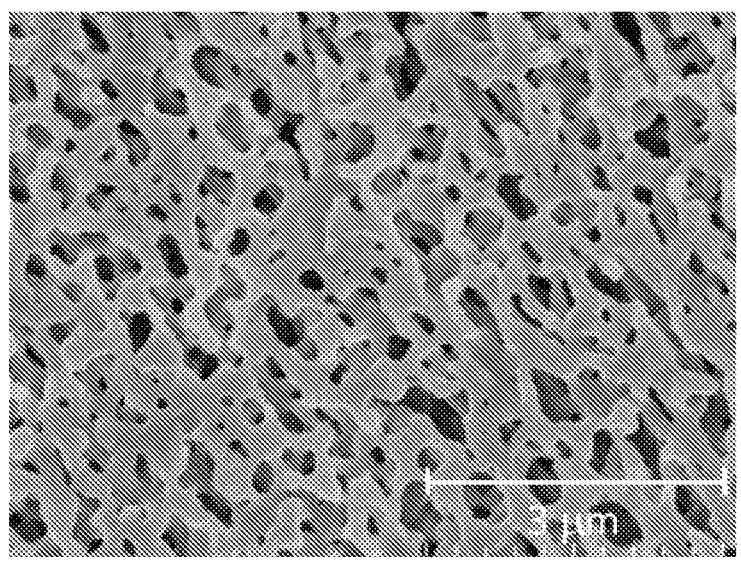
FIG. 9: Is an SEM of Example 6 of the invention, showing a co-continuous morphology.

This example was prepared according to the procedure described for Example 1, except that the hexafluoropropylene (534.0 g, comprising 25.0% of the total VDF and HFP used in the herein example) was added when approximately 800 g of VDF (representing 49.9% of the VDF utilized in the example) was added to the reaction mass. The reaction continued until a total of 1602.0 g of VDF had been added to the reaction mass. The resin displayed a melt viscosity of 7.7 Kpoise, measured at 232° C. at 100 sec$^{-1}$ (ASTM D3835), a DSC melting point of 159 to 160° C., and an HFP content of 20.3% (based on total dry resin weight), as determined by $^{19}$F NMR. The SEM is shown in FIG. 9, and shows a co-continuous copolymer phase. This example shows that heterogeneous PVDF/HFP copolymers, containing very high levels of HFP, which was added to the reaction mass after about 45% of the VDF has been polymerized, can be prepared, and have high melting points.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:
1. A melt-processable heterogeneous copolymer composition comprising two or more co-continuous phases, wherein said co-continuous phases comprise:
   a) from 25 to 50 weight percent of a first co-continuous phase comprising 90 to 100 weight percent of vinylidene fluoride monomer units and 0 to 10 weight percent of other fluoromonomers units, and
   b) from greater than 50 weight percent to 75 weight percent of a second co-continuous phase comprising from 65 to 95 weight percent of vinylidene fluoride monomer units and an effective amount of one or more comonomers selected from the group consisting of hexafluoropropylene and perfluoroalkylvinyl ether to cause the second co-continuous phase to phase separate from the first continuous phase.

2. The heterogeneous copolymer composition of aspect 1, wherein said copolymer composition comprises from 2.5 to 31 weight percent, preferably from 2.5 to 26 weight percent of one or more fluoromonomer units, based on the total weight of monomer units in the copolymer composition.

3. The heterogeneous copolymer composition of aspects 1 or 2, wherein said copolymer composition comprises from 2.5 to 31 weight percent of hexafluoropropylene monomer units, based on the total weight of monomer units in the copolymer composition.

4. The heterogeneous copolymer composition of any of aspects 1 to 3, wherein said copolymer composition comprises from 13 to 23 weight percent of hexafluoropropylene monomer units, based on the total weight of monomer units in the copolymer composition.

5. The heterogeneous copolymer composition of any of aspects 1 to 4, wherein said second-phase copolymer comprises as the effective amount of comonomer from 5 to 35 weight percent, preferably from 15.5 to 33 weight percent, and more preferably from 26 to 31 weight percent of hexafluoropropylene monomer units, based on the total weight of said copolymer.

6. The heterogeneous copolymer composition of any of aspects 1 to 5, wherein said first-phase copolymer comprises a polyvinylidene fluoride homopolymer.

7. The heterogeneous copolymer composition of any of aspects 1 to 6, wherein said copolymer composition comprises from 30 to 50 weight percent, preferably 35 to 48 weight percent, of said first co-continuous phase polymer and from greater than 50 to 70 weight percent, preferably 52 to 65 weight percent of said second co-continuous phase polymer.

8. The heterogeneous copolymer composition of any of aspects 1 to 7, wherein said copolymer has a melting point in the range of from 150 to 175° C.

9. A process for forming a melt-processable heterogeneous vinylidene fluoride copolymer composition having two or more co-continuous phases, comprising the steps of:
   a) charging to a reactor an initial charge comprising water, surfactant, vinylidene fluoride, and an initiator;
   b) initiating the polymerization;
   c) feeding to the reactor a feed comprising vinylidene fluoride and initiator until 25 to less than 50 weight percent of the total weight of vinylidene fluoride to be used in the reaction has been fed to the reactor, to form a first-phase polymer;
   d) adding to the reactor a fluoro-comonomer selected from the group consisting of hexafluoropropylene and perfluoroalkylvinyl ether in an effective amount to cause the vinylidene fluoride copolymer formed as the second phase copolymer to phase separate from the first phase polymer;
   e) continuing the feed of vinylidene fluoride and initiator until all of the vinylidene fluoride has been added to the reactor, to form a heterogeneous, co-continuous polyvinylidene copolymer composition; and
   f) removing the co-continuous polyvinylidene fluoride copolymer composition from the reactor.

10. The process of aspect 9, wherein no fluorosurfactant is used at any point in the process, producing a fluorosurfactant-free heterogeneous, co-continuous polyvinylidene fluoride copolymer.

11. The process of any of aspects 9 and 10, wherein said fluoro-comonomer of step d) is hexafluoropropylene and said effective amount of said co-monomer is from 5 to 35 weight percent of hexafluoropropylene monomer units, based on the total weight of said copolymer.

12. The process of any of aspects 9 to 11, wherein said co-continuous polyvinylidene copolymer composition comprises from 2.5 to 31 weight percent of hexafluoropropylene monomer units, based on the total weight of monomer units in the copolymer composition.

13. An article formed from the heterogeneous, co-continuous copolymer composition of aspects 1 to 8, or made by the process of any of aspects 9 to 12.

14. The article of aspect 13, wherein said article further comprises one or more additives selected from the group consisting of plasticizers, antioxidants, flame retardants, fillers, fibers, thermal stabilizers, waxes, lubricants, metal oxides, colorants, conductive fillers, antistatics, and antimicrobial agents.

15. The article of aspects 13 and 14, wherein said article is selected from the group consisting of jacketing, primary layer, buffer layer or strength member for a wire or cable; a filtration membrane; a battery separator; a foamed article; a tube, film, sheet, rod, or fiber; a gasket; an umbilical or riser for oil and gas applications; an oil and gas tank liners, a tubing, bags or containers for sterile uses, pharmaceutical production and distribution, food and beverage contact, and biological applications; corrosion resistant powder coatings for metal substrates, extruded sheet linings for tank fabrication on metal or as a dual laminate and products produced using articles mentioned herein.

What is claimed is:

1. A melt-processable heterogeneous copolymer composition comprising two or more co-continuous phases, wherein said co-continuous phases comprise:
   a) from 25 to 50 weight percent of a first co-continuous phase comprising 90 to 100 weight percent of vinylidene fluoride monomer units and 0 to 10 weight percent of other fluoromonomers units, and
   b) from greater than 50 weight percent to 75 weight percent of a second co-continuous phase comprising from 65 to 95 weight percent of vinylidene fluoride monomer units and an effective amount of one or more comonomers selected from the group consisting of hexafluoropropylene and perfluoroalkylvinyl ether to cause the second co-continuous phase to phase separate from the first continuous phase, and
   wherein the heterogeneous copolymer composition comprises a single melting point from 150° C. to 175° C.

2. The heterogeneous copolymer composition of claim 1, wherein said copolymer composition comprises from 2.5 to 31 weight percent of one or more co-monomer units, based on the total weight of monomer units in the copolymer composition.

3. The heterogeneous copolymer composition of claim 1, wherein said copolymer composition comprises from 2.5 to 31 weight percent of hexafluoropropylene monomer units, based on the total weight of monomer units in the copolymer composition.

4. The heterogeneous copolymer composition of claim 3, wherein said copolymer composition comprises from 2.5 to 26 weight percent of hexafluoropropylene monomer units, based on the total weight of monomer units in the copolymer composition.

5. The heterogeneous copolymer composition of claim 4, wherein said copolymer composition comprises from 13 to 23 weight percent of hexafluoropropylene monomer units, based on the total weight of monomer units in the copolymer composition.

6. The heterogeneous copolymer composition of claim 1, wherein said second co-continuous phase comprises as the effective amount of comonomer from 5 to 35 weight percent of hexafluoropropylene monomer units, based on the total weight of said copolymer.

7. The heterogeneous copolymer composition of claim 6, wherein said second co-continuous phase comprises from 15.5 to 33 weight percent of hexafluoropropylene monomer units, based on the total weight of said copolymer.

8. The heterogeneous copolymer composition of claim 7, wherein said second co-continuous phase comprises from 26 to 31 weight percent of hexafluoropropylene monomer units, based on the total weight of said copolymer.

9. The heterogeneous copolymer composition of claim 1, wherein said first-co-continuous phase comprises a polyvinylidene fluoride homopolymer.

10. The heterogeneous copolymer composition of claim 1, wherein said copolymer composition comprises from 30 to 50 weight percent of said first co-continuous phase and from greater than 50 to 70 weight percent of said second co-continuous phase.

11. The heterogeneous copolymer composition of claim 10, wherein said copolymer composition comprises from 35 to 48 weight percent of said first co-continuous phase and from greater than 52 to 65 weight percent of said second co-continuous phase.

12. A process for forming a melt-processable heterogeneous vinylidene fluoride copolymer composition of claim 1 having two or more co-continuous phases, comprising the steps of:
   a) charging to a reactor an initial charge comprising water, surfactant, vinylidene fluoride, and an initiator;
   b) initiating the polymerization;
   c) feeding to the reactor a feed comprising vinylidene fluoride and initiator until 25 to less than 50 weight percent of the total weight of vinylidene fluoride to be used in the reaction has been fed to the reactor, to form a first-phase polymer;
   d) adding to the reactor a fluoro-comonomer selected from the group consisting of hexafluoropropylene and perfluoroalkylvinyl ether in an effective amount to cause the vinylidene fluoride copolymer formed as the second phase copolymer to phase separate from the first phase polymer;
   e) continuing the feed of vinylidene fluoride and initiator until all of the vinylidene fluoride has been added to the reactor, to form a heterogeneous, co-continuous polyvinylidene copolymer composition; and
   f) removing the co-continuous polyvinylidene fluoride copolymer composition from the reactor.

13. The process of claim 12, wherein no fluorosurfactant is used at any point in the process, producing a fluorosurfactant-free heterogeneous, co-continuous polyvinylidene fluoride copolymer.

14. The process of claim 12, wherein said fluoro-comonomer of step d) is hexafluoropropylene and said effective amount of said co-monomer is from 5 to 35 weight percent of hexafluoropropylene monomer units, based on the total weight of said copolymer.

15. The process of claim 12, wherein said co-continuous polyvinylidene copolymer composition comprises from 2.5 to 31 weight percent of hexafluoropropylene monomer units, based on the total weight of monomer units in the copolymer composition.

16. An article formed from the heterogeneous copolymer composition of claim 1.

17. The article of claim 16, wherein said article further comprises one or more additives selected from the group consisting of plasticizers, antioxidants, flame retardants, fillers, fibers, thermal stabilizers, waxes, lubricants, metal oxides, colorants, conductive fillers, antistatics, and antimicrobial agents.

18. The article of claim 16, wherein said article is selected from the group consisting of jacketing, primary layer, buffer layer or strength member for a wire or cable; a filtration membrane; a battery separator; a foamed article; a tube, film, sheet, rod, or fiber; a gasket; an umbilical or riser for oil and gas applications; an oil and gas tank liners, a tubing, bags or containers for sterile uses, pharmaceutical production and distribution, food and beverage contact, and biological applications; corrosion resistant powder coatings for metal substrates, extruded sheet linings for tank fabrication on metal or as a dual laminate and products produced using articles mentioned herein.

* * * * *